United States Patent
Wang et al.

(10) Patent No.: US 11,087,203 B2
(45) Date of Patent: Aug. 10, 2021

(54) METHOD AND APPARATUS FOR PROCESSING DATA SEQUENCE

(71) Applicant: BEIJING BAIDU NETCOM SCIENCE AND TECHNOLOGY CO., LTD., Beijing (CN)

(72) Inventors: Yong Wang, Beijing (CN); Jian Ouyang, Beijing (CN); Wei Qi, Beijing (CN); Sizhong Li, Beijing (CN)

(73) Assignee: Beijing Baidu Netcom Science and Technology, Co., Ltd, Beijing (CN)

( * ) Notice: Subject to any disclaimer, the term of this patent is extended or adjusted under 35 U.S.C. 154(b) by 1047 days.

(21) Appl. No.: 15/618,415

(22) Filed: Jun. 9, 2017

(65) Prior Publication Data
US 2018/0129933 A1 May 10, 2018

(30) Foreign Application Priority Data
Nov. 10, 2016 (CN) .......................... 201610990113.X (51) Int. Cl.
*G06N 3/04* (2006.01)
*G06N 3/063* (2006.01)

(52) U.S. Cl.
CPC ........... *G06N 3/0445* (2013.01); *G06N 3/063* (2013.01)

(58) Field of Classification Search
CPC ................. G05D 1/0274; G06F 17/16; G06F 2207/4824; G06F 7/501; G06F 7/523; G06F 9/48; G06F 9/4812; G06N 3/04; G06N 3/0454; G06N 3/063; G06N 3/0445; G06T 2207/20084; G06T 15/08; G10L 15/16; G10L 15/02
See application file for complete search history.

(56) References Cited

U.S. PATENT DOCUMENTS

| 5,646,652 A * | 7/1997 | Saidi .................... G09G 3/3625 345/208 |
| 2018/0046897 A1* | 2/2018 | Kang .................... G06F 7/5443 |
| 2018/0276035 A1* | 9/2018 | Henry ....................... G06N 3/04 |

FOREIGN PATENT DOCUMENTS

CN    105681628 A    6/2016

OTHER PUBLICATIONS

Chang et al. "Recurrent Neural Networks Hardware Implementation on FPGA", CoRR, 2015, pp. 8.*

* cited by examiner

*Primary Examiner* — Li Wu Chang
(74) *Attorney, Agent, or Firm* — von Briesen & Roper, s.c.

(57) ABSTRACT

The present application discloses a method and apparatus for processing a data sequence. A specific implementation of the method includes: receiving an inputted to-be-processed data sequence; copying a weight matrix in a recurrent neural network model to an embedded block random access memory (RAM) of a field-programmable gate array (FPGA); processing sequentially each piece of to-be-processed data in the to-be-processed data sequence by using an activation function in the recurrent neural network model and the weight matrix stored in the embedded block RAM; and outputting a processed data sequence corresponding to the to-be-processed data sequence. This implementation improves the data sequence processing efficiency of the recurrent neural network model.

12 Claims, 5 Drawing Sheets

METHOD AND APPARATUS FOR PROCESSING DATA SEQUENCE

CROSS-REFERENCE TO RELATED APPLICATION

This application is related to and claims priority from Chinese Application No. 201610990113.X, filed on Nov. 10, 2016 and entitled "Method and Apparatus for Processing Data Sequence", the entire disclosure of which is hereby incorporated by reference.

TECHNICAL FIELD

The present application relates to the field of computer technology, specifically to the field of data processing technology, and more specifically to a method and apparatus for processing a data sequence.

BACKGROUND

Recurrent neural network (RNN) is a class of artificial neural network where connections between nodes form a directed cycle. This creates an internal state of the network which allows it to exhibit dynamic temporal behavior. Unlike feedforward neural networks, RNNs can use their internal memory to process arbitrary sequences of inputs. This makes them applicable to tasks such as unsegmented connected handwriting recognition or speech recognition. Currently, RNN models have been widely applied to services such as video process, speech recognition, and semantic interpretation.

When an RNN model is used to process a data sequence, first, a weight matrix of the RNN model needs to be copied to a first level cache of a central processing unit (CPU) or graphics processing unit (GPU), and then the data sequence is processed by using an activation function in the RNN model and the weight matrix stored in the first level cache.

However, the first level cache generally has a small capacity and cannot store all weight matrixes in the RNN model at the same time. In addition, because there are feedbacks, the RNN model cannot simultaneously process all the data in the data sequence. Therefore, each time the RNN model processes a piece of data in the data sequence, copying of a weight matrix to the first level cache of the CPU or the GPU needs to be performed, leading to a low data sequence processing efficiency of the RNN model.

SUMMARY

An objective of the present application is to provide an improved method and apparatus for processing a data sequence, in order to solve the technical problem mentioned above.

According to a first aspect, the present application provides a method for processing a data sequence, comprising: receiving an inputted to-be-processed data sequence; copying a weight matrix in a recurrent neural network model to an embedded block random access memory (RAM) of a field-programmable gate array (FPGA); processing sequentially each piece of to-be-processed data in the to-be-processed data sequence by using an activation function in the recurrent neural network model and the weight matrix stored in the embedded block RAM; and outputting a processed data sequence corresponding to the to-be-processed data sequence.

In some embodiments, the method further comprises: deleting the weight matrix stored in the embedded block RAM after the processed data sequence is output.

In some embodiments, before the copying a weight matrix in a recurrent neural network model to an embedded block random access memory (RAM) of a field-programmable gate array (FPGA), the method comprises: calling an address assignment interface to assign a storage address in the embedded block RAM to the weight matrix.

In some embodiments, the copying a weight matrix in a recurrent neural network model to an embedded block random access memory (RAM) of a field-programmable gate array (FPGA) comprises: calling a copying interface to copy the weight matrix stored in a double data rate synchronous dynamic random access memory to the storage address in the embedded block RAM that is assigned to the weight matrix.

In some embodiments, the deleting the weight matrix stored in the embedded block RAM comprises: calling a deletion interface to delete the weight matrix stored in the embedded block RAM.

In some embodiments, the embedded block RAM is a static random access memory.

According to a second aspect, the present application provides an apparatus for processing a data sequence, comprising: a receiving unit, configured to receive an inputted to-be-processed data sequence; a copying unit, configured to copy a weight matrix in a recurrent neural network model to an embedded block random access memory (RAM) of a field-programmable gate array (FPGA); a processing unit, configured to process sequentially each piece of to-be-processed data in the to-be-processed data sequence by using an activation function in the recurrent neural network model and the weight matrix stored in the embedded block RAM; and an output unit, configured to output a processed data sequence corresponding to the to-be-processed data sequence.

In some embodiments, the apparatus further comprises: a deletion unit, configured to delete the weight matrix stored in the embedded block RAM after the processed data sequence is output.

In some embodiments, the apparatus further comprises: an assignment unit, configured to call an address assignment interface to assign a storage address in the embedded block RAM to the weight matrix.

In some embodiments, the copying unit is further configured to: call a copying interface to copy the weight matrix stored in a double data rate synchronous dynamic random access memory to the storage address in the embedded block RAM that is assigned to the weight matrix.

In some embodiments, the deletion unit is further configured to call a deletion interface to delete the weight matrix stored in the embedded block RAM.

In some embodiments, the embedded block RAM is a static random access memory.

According to the method and apparatus for processing a data sequence as provided in the present application, after a to-be-processed data sequence is received, a weight matrix in a recurrent neural network model is copied to an embedded block RAM of an FPGA first; then each piece of to-be-processed data in the to-be-processed data sequence is processed sequentially by using an activation function in the recurrent neural network model and the weight matrix stored in the embedded block RAM; and finally, a processed data sequence is output. In the process of processing the to-be-processed data sequence, the weight matrix in the recurrent neural network model is copied only once, and is always stored in the embedded block RAM of the FPGA, so that the data sequence processing efficiency of the recurrent neural network model is improved.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
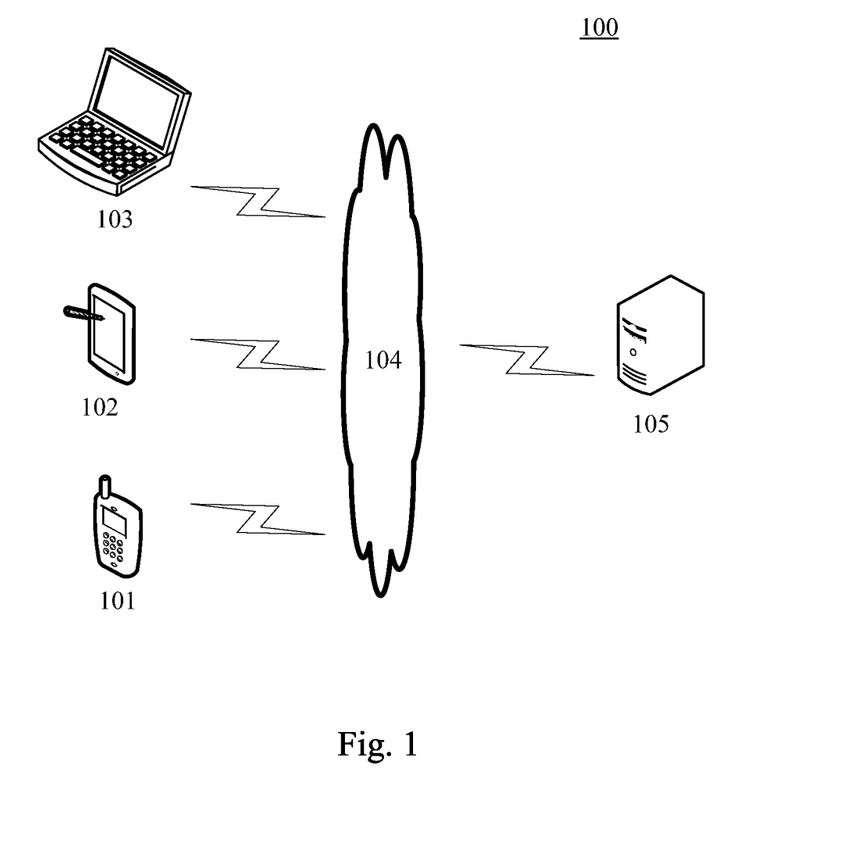
FIG. 1 is an exemplary architecture diagram of a system to which the present application may be applied.

FIG. 1 shows an exemplary architecture of a system 100 to which the method or apparatus for processing a data sequence according to embodiments of the present application may be applied.

As shown in FIG. 1, the system architecture 100 may include terminal devices 101, 102 and 103, a network 104 and a server 105 embedded with a field-programmable gate array (FPGA) chip (not shown). The network 104 serves as a medium providing a communication link between the terminal devices 101, 102 and 103 and the server 105. The network 104 may include various types of connections, such as wired or wireless communication links, or optical fibers.

The user may use the terminal devices 101, 102 and 103 to interact with the server 105 through the network 104, in order to transmit or receive data sequences, etc.

The terminal devices 101, 102, and 103 may be various electronic devices supporting the input and output of a data sequence, including but not limited to, a smart phone, a tablet computer, a laptop portable computer, a desktop computer, and the like.

The server 105 may provide various services. For example, the server 105 may copy a weight matrix in a recurrent neural network model to an embedded block random access memory (RAM) of a field-programmable gate array (FPGA); process (such as, analyze) sequentially each piece of to-be-processed data in the to-be-processed data sequence by using an activation function in the recurrent neural network model and the weight matrix stored in the embedded block RAM; and output a processing result to a terminal device.

It should be noted that the method for processing a data sequence according to the embodiments of the present application may be executed by the server 105. Accordingly, the apparatus for processing a data sequence may be set in the server 105.

It should be appreciated that the numbers of the target devices, the network and the server in FIG. 1 are merely illustrative. Any number of terminal devices, networks and servers may be provided based on the actual requirements.

Figure 2:
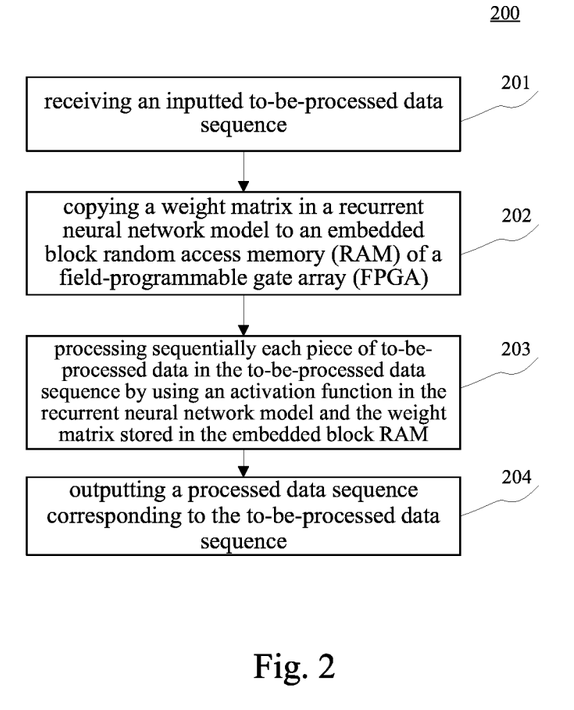
FIG. 2 is a flow chart of a method for processing a data sequence according to an embodiment of the present application.

Referring to FIG. 2, a flow 200 of a method for processing a data sequence according to an embodiment of the present application is illustrated. The method for processing a data sequence includes the following steps.

At step 201, an inputted to-be-processed data sequence is received.

In this embodiment, an electronic device (for example, the server 105 shown in FIG. 1) on which the method for processing a data sequence runs may receive a to-be-processed data sequence from a terminal by means of a wired connection or a wireless connection.

In this embodiment, because recurrent neural networks can use their internal memory to process arbitrary sequences of inputs, the inputted to-be-processed data sequence may be a piece of speech information, a statement to be interpreted, or a vector sequence. As an example, the to-be-processed data sequence is a vector sequence $x(0), x(1), \ldots, x(t)$.

It should be noted that, the format and content of the to-be-processed data sequence are not limited in this embodiment.

At step 202, a weight matrix in a recurrent neural network model is copied to an embedded block random access memory (RAM) of a field-programmable gate array (FPGA).

In this embodiment, after receiving the to-be-processed data sequence, the electronic device (for example, the server 105 shown in FIG. 1) may copy a weight matrix in a recurrent neural network model to an embedded block random access memory (RAM) of an FPGA.

In this embodiment, the recurrent neural network may be a Long Short-Term Memory (LSTM) RNN or a Gated Recurrent Unit (GRU) RNN. The recurrent neural network model may include an input layer, a hidden layer, and an output layer. In the recurrent neural network model, there is a unidirectional information flow from the input layer to the hidden layer, there is a unidirectional information flow from the hidden layer to the output layer, and there is an information flow that flows from the output end of the hidden layer back to the input end of the hidden layer. Each information flow may correspond to one weight matrix. The weight matrix may be a parameter matrix that is preset based on relative importance of each information flow.

In this embodiment, the FPGA may be a programmable device. Its chip mainly includes: a programmable input/output unit, a basic programmable logic unit, complete clock management, an embedded block RAM, rich wiring resources, an embedded underlying functional unit, and an embedded dedicated hardware module. The embedded block RAM generally has a large storage capacity, and can store all weight matrixes in the recurrent neural network model at the same time.

At step 203, each piece of to-be-processed data in the to-be-processed data sequence is processed sequentially by using an activation function in the recurrent neural network model and the weight matrix stored in the embedded block RAM.

In this embodiment, after copying the weight matrix in the recurrent neural network model to the embedded block RAM of the FPGA, the electronic device (for example, the server 105 shown in FIG. 1) may first perform calculation according to the weight matrix stored in the embedded block RAM of the FPGA and the to-be-processed data sequence, and then perform processing by using an activation function in the recurrent neural network model, to generate a processed data sequence.

In this embodiment, the activation function may be a non-linear function. The activation function may be a sigmoid function, a tank (hyperbolic tangent) function or a softmax function. The activation function in the recurrent neural network is mainly responsible for providing a non-linear modeling capability of the network. The addition of the activation function to the recurrent neural network enables the network to have a layered non-linear mapping and learning capability. As an example, in the RNN model, a data sequence x(0), x(1), . . . , x(t) is input at the input layer, a data sequence s(0), s(1), . . . , s(t) is output from the hidden layer, a data sequence y(0), y(1), . . . , y(t) is output from the output layer, the information flow from the input layer to the hidden layer corresponds to a weight matrix U, the information flow from the hidden layer to the output layer corresponds to a weight matrix W, the information flow that flows from the output end of the hidden layer back to the input end of the hidden layer corresponds to a weight matrix V, the hidden layer has an activation function ƒ, the output layer has an activation function g, and equations for processing a data sequence by using the recurrent neural network model are as follows:

$$s(t)=f(x(t)\times U+s(t-1)\times V), s(0)=0; \text{and}$$

$$y(t)=g(s(t)\times W).$$

It should be noted that, the method for processing a data sequence by using a recurrent neural network is well-known in the art and has been widely studied and applied, and will not be repeatedly described here.

At step 204, a processed data sequence corresponding to the to-be-processed data sequence is output.

In this embodiment, after processing sequentially each piece of to-be-processed data in the to-be-processed data sequence by using the activation function in the recurrent neural network model and the weight matrix stored in the embedded block RAM, the electronic device (for example, the server 105 shown in FIG. 1) may generate and output a processed data sequence. As an example, if the inputted to-be-processed data sequence is a piece of speech information, the processed data sequence may be corresponding text information generated by performing speech recognition on the speech information; if the inputted to-be-processed data sequence is a statement to be interpreted, the processed data sequence may be a corresponding interpreted statement generated by performing semantic interpretation on the statement to be interpreted.

In some optional implementations of this embodiment, the electronic device (for example, the server 105 shown in FIG. 1) may delete the weight matrix stored in the embedded block RAM after the processed data sequence is output. In this way, the memory of the embedded block RAM can be freed in time after the data sequence processing is completed.

In some optional implementations of this embodiment, the embedded block RAM may be a static random access memory. The SRAM (Static Random Access Memory, static random access memory) is a memory having a static access function, and can save data stored therein without a refresh circuit. Therefore, the SRAM has high performance, and requires low power consumption.

According to the method provided in this embodiment of the present application, a weight matrix in a recurrent neural network model is copied to an embedded block RAM of an FPGA, so that in the process of processing a to-be-processed data sequence, the weight matrix in the recurrent neural network model is copied only once, and is always stored in the embedded block RAM of the FPGA, so that the data sequence processing efficiency of the recurrent neural network model is improved.

Figure 3:
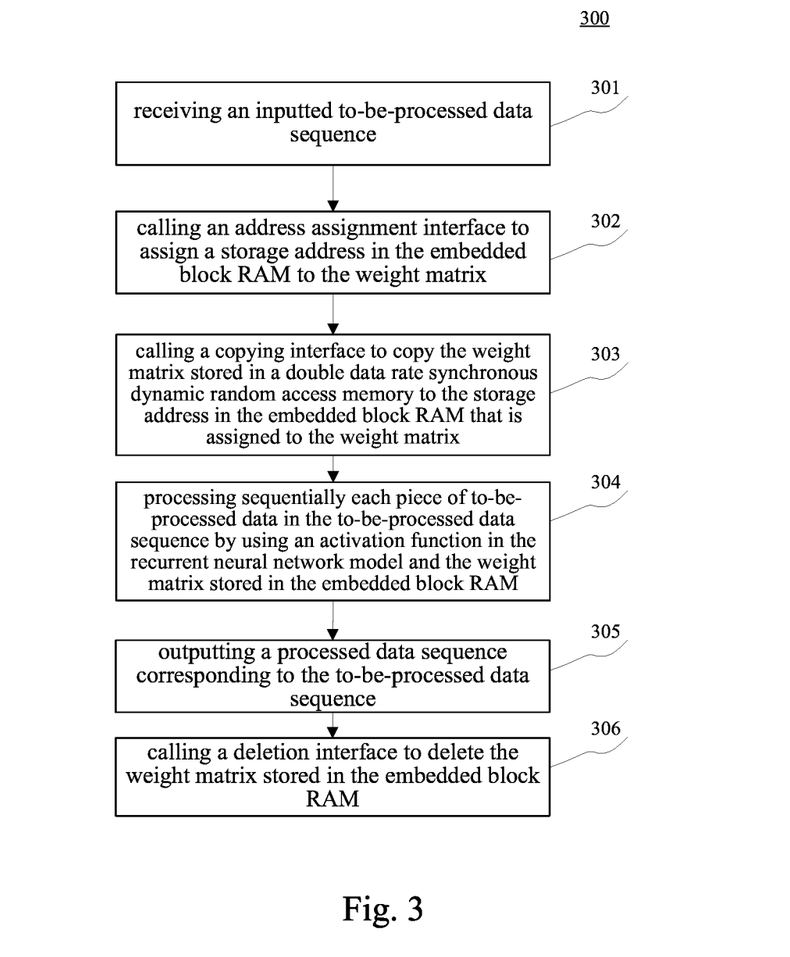
FIG. 3 is a flow chart of a method for processing a data sequence according to another embodiment of the present application.

Referring to FIG. 3, a flow 300 of a method for processing a data sequence according to another embodiment of the present application is illustrated. The flow 300 of the method for processing a data sequence includes the following steps.

At step 301, an inputted to-be-processed data sequence is received.

In this embodiment, an electronic device (for example, the server 105 shown in FIG. 1) on which the method for processing a data sequence runs may receive a to-be-processed data sequence from a terminal by means of a wired connection or a wireless connection.

At step 302, an address assignment interface is called to assign a storage address in the embedded block RAM to the weight matrix.

In this embodiment, after receiving the to-be-processed data sequence, the electronic device (for example, the server 105 shown in FIG. 1) may call an address assignment interface provided by software, to assign a storage address in the embedded block RAM to the weight matrix.

In this embodiment, the embedded block RAM in the FPGA chip may be controlled by software. First, the software needs to provide an address assignment interface. The electronic device may call the address assignment interface to assign a storage address to the weight matrix. As an example, the software provides an address assignment interface "void *cache_alloc(size_t len)", and the electronic device calls the address assignment interface to assign storage addresses to the weight matrixes U, V, and W according to "U_addr=cache_alloc(U_size)", "V_addr=cache_alloc(V_size)", and "W_addr=cache_alloc(W_size)".

At step 303, a copying interface is called to copy the weight matrix stored in a double data rate synchronous dynamic random access memory to the storage address in the embedded block RAM that is assigned to the weight matrix.

In this embodiment, after assigning the storage address in the embedded block RAM to the weight matrix, the electronic device (for example, the server 105 shown in FIG. 1) may call a copying interface provided by software, to copy the weight matrix from the double data rate synchronous dynamic random access memory (DDR) to the storage address in the embedded block RAM that is assigned to the weight matrix. The weight matrix of the recurrent neural network model is generally stored in advance in a DDR of a CPU.

In this embodiment, the embedded block RAM in the FPGA chip may also be controlled by software. First, the software needs to provide a copying interface. The electronic device may call the copying interface to copy the weight matrix from the DDR of the CPU to the storage address in the embedded block RAM that is assigned to the weight matrix. As an example, the software provides a copying interface "copy_to_fpga_cache (void *cpu_addr, void *cache_addr, size_t len)", and the electronic device calls the copying interface to copy the weight matrixes U, V, and W from the DDR of the CPU to the storage address in the embedded block RAM that is assigned to the weight matrix, according to "copy_to_fpga_cache (void *cpu_addr, void *U_addr, U_size)", "copy_to_fpga_cache(void *cpu_addr, void *V_addr, V_size)", and "copy_to_fpga_cache (void *cpu_addr, void *W_addr, W_size)".

At step 304, each piece of to-be-processed data in the to-be-processed data sequence is processed sequentially by using an activation function in the recurrent neural network model and the weight matrix stored in the embedded block RAM.

In this embodiment, after copying the weight matrix in the recurrent neural network model to the embedded block RAM of the FPGA, the electronic device (for example, the server 105 shown in FIG. 1) may first perform calculation according to the weight matrix stored in the embedded block RAM of the FPGA and the to-be-processed data sequence, and then perform processing by using an activation function in the recurrent neural network model, to generate a processed data sequence.

At step 305, a processed data sequence corresponding to the to-be-processed data sequence is output.

In this embodiment, after processing sequentially each piece of to-be-processed data in the to-be-processed data sequence by using an activation function in the recurrent neural network model and the weight matrix stored in the embedded block RAM, the electronic device (for example, the server 105 shown in FIG. 1) may generate and output a processed data sequence. As an example, if the inputted to-be-processed data sequence is a piece of speech information, the processed data sequence may be corresponding text information generated by performing speech recognition on the speech information; if the inputted to-be-processed data sequence is a statement to be interpreted, the processed data sequence may be a corresponding interpreted statement generated by performing semantic interpretation on the statement to be interpreted.

At step 306, a deletion interface is called to delete the weight matrix stored in the embedded block RAM, after the processed data sequence is output.

In this embodiment, after outputting the processed data sequence, the electronic device (for example, the server 105 shown in FIG. 1) may call a deletion interface to delete the weight matrix stored in the embedded block RAM.

In this embodiment, the embedded block RAM in the FPGA chip may also be controlled by software. First, the software needs to provide a deletion interface. The electronic device may call the deletion interface to delete the weight matrix stored in the embedded block RAM. As an example, the software provides a deletion interface "void cache_free(void *addr)", and the electronic device calls the deletion interface to delete the weight matrixes U, V, and W stored in the embedded block RAM, according to "cache_free(U_addr)", "cache_free(V_addr)", and "cache_free (W_addr)".

As can be seen from FIG. 3, compared with the embodiment corresponding to FIG. 2, the flow 300 of the method for processing a data sequence in this embodiment highlights the step of controlling the embedded block RAM in the FPGA chip by using software. Therefore, the solution provided in this embodiment can more conveniently control the location at which and the time for which the weight matrix in the recurrent neural network model is stored in the embedded block RAM.

Figure 4:
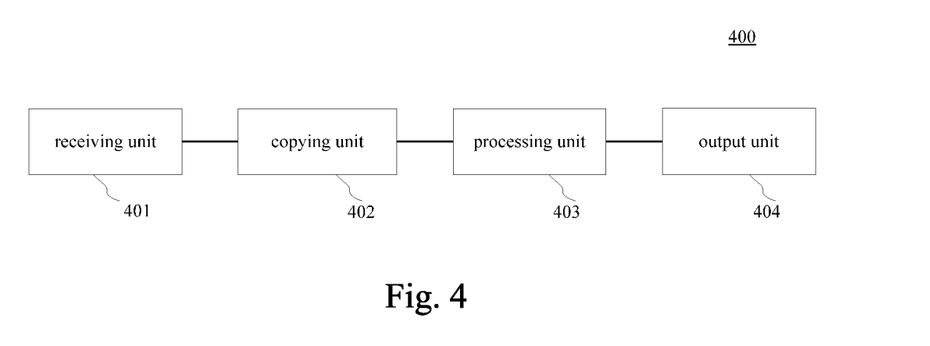
FIG. 4 is a schematic structural diagram of an apparatus for processing a data sequence according to an embodiment of the present application.

Referring to FIG. 4, as an implementation of the methods shown in the above-mentioned figures, the present application provides an embodiment of an apparatus for processing a data sequence. This apparatus embodiment corresponds to the method embodiment shown in FIG. 2. The apparatus may be specifically applied to various electronic devices.

As shown in FIG. 4, the apparatus 400 for processing a data sequence according to this embodiment includes a receiving unit 401, a copying unit 402, a processing unit 403, and an output unit 404. The receiving unit 401 is configured to receive an inputted to-be-processed data sequence. The copying unit 402 is configured to copy a weight matrix in a recurrent neural network model to an embedded block random access memory (RAM) of a field-programmable gate array (FPGA). The processing unit 403 is configured to process sequentially each piece of to-be-processed data in the to-be-processed data sequence by using an activation function in the recurrent neural network model and the weight matrix stored in the embedded block RAM. The output unit 404 is configured to output a processed data sequence corresponding to the to-be-processed data sequence.

In this embodiment, the receiving unit 401, specific implementations of the copying unit 402, the processing unit 403, and the output unit 404 in the apparatus 400 for processing a data sequence and the technical effects achieved thereby can be referred to the related descriptions of the implementations of step 201, step 202, step 203, and step 204 in the embodiment corresponding to FIG. 2 respectively, and will not be repeatedly described here.

In some optional implementations of this embodiment, the apparatus 400 further includes: a deletion unit (not shown in the figure), configured to delete the weight matrix stored in the embedded block RAM after the processed data sequence is output.

In some optional implementations of this embodiment, the apparatus 400 further includes: an assignment unit (not shown in the figure), configured to call an address assignment interface to assign a storage address in the embedded block RAM to the weight matrix.

In some optional implementations of this embodiment, the copying unit 402 is further configured to call a copying interface to copy the weight matrix stored in a double data rate synchronous dynamic random access memory to the storage address in the embedded block RAM that is assigned to the weight matrix.

In some optional implementations of this embodiment, the deletion unit is further configured to call a deletion interface to delete the weight matrix stored in the embedded block RAM.

In some optional implementations of this embodiment, the embedded block RAM is a static random access memory.

Figure 5:
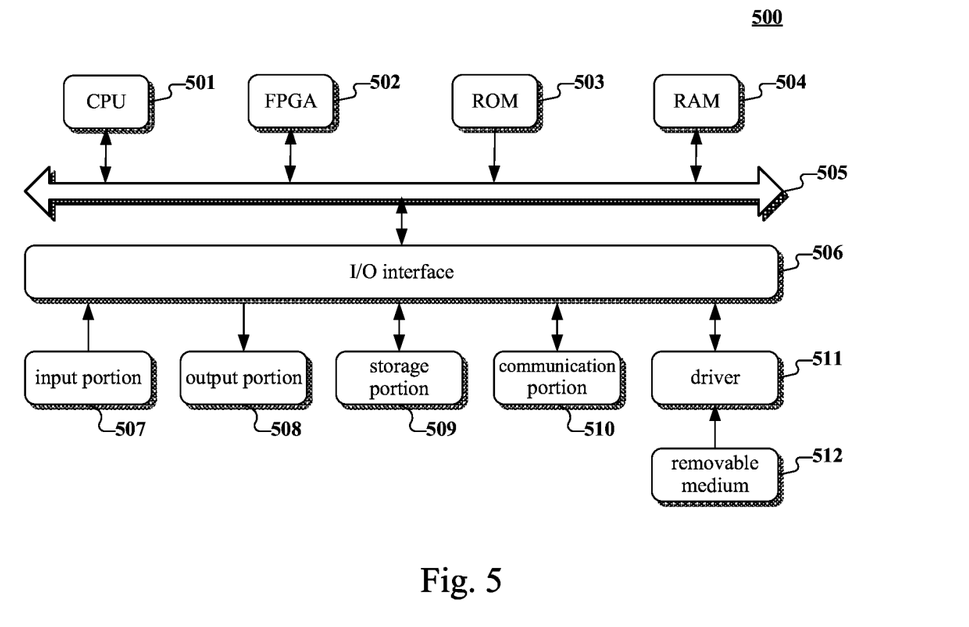
FIG. 5 illustrates a structural schematic diagram of a computer system adapted to implement a server of the embodiments of the present application.

Referring to FIG. 5, a schematic structural diagram of a computer system 500 adapted to implement a server of the embodiments of the present disclosure is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the CPU 501, implements the functions as defined by the methods of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present disclosure may be implemented by way of software or hardware. The described units or modules may also be provided in a processor, for example, described as: a processor, comprising a receiving unit, a copying unit, a processing unit, and an output unit, where the names of these units or modules are not considered as a limitation to the units or modules. For example, the receiving unit may also be described as "a unit for receiving an inputted to-be-processed data sequence".

In another aspect, the present disclosure further provides a non-transitory computer storage medium. The non-transitory computer storage medium may be the non-transitory computer storage medium included in the apparatus in the above embodiments, or a stand-alone non-transitory computer storage medium which has not been assembled into the apparatus. The non-transitory computer storage medium stores one or more programs. The one or more programs, when executed by a device, cause the device to: receive an inputted to-be-processed data sequence; copy a weight matrix in a recurrent neural network model to an embedded block random access memory (RAM) of a field-programmable gate array (FPGA); process sequentially each piece of to-be-processed data in the to-be-processed data sequence by using an activation function in the recurrent neural network model and the weight matrix stored in the embedded block RAM; and output a processed data sequence corresponding to the to-be-processed data sequence.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for processing a data sequence, comprising:
receiving an inputted to-be-processed data sequence;
copying a weight matrix in a recurrent neural network model to an embedded block random access memory (RAM) of a field-programmable gate array (FPGA);
processing sequentially each piece of to-be-processed data in the to-be-processed data sequence by using an activation function in the recurrent neural network model and the weight matrix stored in the embedded block RAM; and
outputting a processed data sequence corresponding to the to-be-processed data sequence,
wherein before the copying, the method further comprises:
calling an address assignment interface to assign a storage address in the embedded block RAM to the weight matrix, and
wherein the copying comprises:
calling a copying interface to copy the weight matrix stored in a double data rate synchronous dynamic random access memory to the storage address in the embedded block RAM that is assigned to the weight matrix,
wherein the copying of the weight matrix is performed only once during the process of processing the to-be-processed data sequence.

2. The method according to claim 1, further comprising:
deleting the weight matrix stored in the embedded block RAM after the processed data sequence is output.

3. The method according to claim 2, wherein the deleting the weight matrix stored in the embedded block RAM comprises:
calling a deletion interface to delete the weight matrix stored in the embedded block RAM.

4. The method according to claim 1, wherein the embedded block RAM is a static random access memory.

5. An apparatus for processing a data sequence, comprising:
- at least one processor; and
- a memory storing instructions, which when executed by the at least one processor, cause the at least one processor to perform operations, the operations comprising:
- receiving an inputted to-be-processed data sequence;
- copying a weight matrix in a recurrent neural network model to an embedded block random access memory (RAM) of a field-programmable gate array (FPGA);
- processing sequentially each piece of to-be-processed data in the to-be-processed data sequence by using an activation function in the recurrent neural network model and the weight matrix stored in the embedded block RAM; and
- outputting a processed data sequence corresponding to the to-be-processed data sequence,
- wherein, the operations further comprises, before the copying:
- calling an address assignment interface to assign a storage address in the embedded block RAM to the weight matrix, and
- wherein the copying comprises;
- calling a copying interface to copy the weight matrix stored in a double data rate synchronous dynamic random access memory to the storage address in the embedded block RAM that is assigned to the weight matrix,
- wherein the copying of the weight matrix is performed only once during the process of processing the to-be-processed data sequence.

6. The apparatus according to claim 5, wherein the operations further comprises:
- deleting the weight matrix stored in the embedded block RAM after the processed data sequence is output.

7. The apparatus according to claim 6, wherein the deleting the weight matrix stored in the embedded block RAM comprises:
- calling a deletion interface to delete the weight matrix stored in the embedded block RAM.

8. The apparatus according to claim 5, wherein the embedded block RAM is a static random access memory.

9. A non-transitory storage medium storing one or more programs, the one or more programs when executed by an apparatus, causing the apparatus to perform operations, the operations comprising:
- receiving an inputted to-be-processed data sequence;
- copying a weight matrix in a recurrent neural network model to an embedded block random access memory (RAM) of a field-programmable gate array (FPGA);
- processing sequentially each piece of to-be-processed data in the to-be-processed data sequence by using an activation function in the recurrent neural network model and the weight matrix stored in the embedded block RAM; and
- outputting a processed data sequence corresponding to the to-be-processed data sequence,
- wherein the operations further comprises, before the copying:
- calling an address assignment interface to assign a storage address in the embedded block RAM to the weight matrix, and
- wherein the copying comprises:
- calling a copying interface to copy the weight matrix stored in a double data rate synchronous dynamic random access memory to the storage address in the embedded block RAM that is assigned to the weight matrix,
- wherein the copying of the weight matrix is performed only once during the process of processing the to-be-processed data sequence.

10. The non-transitory storage medium according to claim 9, wherein the operations further comprises:
- deleting the weight matrix stored in the embedded block RAM after the processed data sequence is output.

11. The non-transitory storage medium according to claim 10, wherein the deleting the weight matrix stored in the embedded block RAM comprises:
- calling a deletion interface to delete the weight matrix stored in the embedded block RAM.

12. The non-transitory storage medium according to claim 9, wherein the embedded block RAM is a static random access memory.

* * * * *